Figure 2:
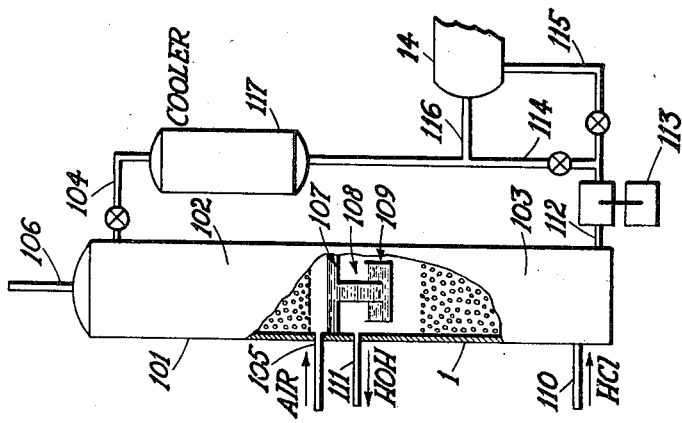

April 15, 1947. E. GORIN 2,418,931

RECOVERY OF HALOGENS

Filed Nov. 9, 1945

Everett Gorin
INVENTOR

BY Sidney A. Johnson
ATTORNEY

Patented Apr. 15, 1947

2,418,931

UNITED STATES PATENT OFFICE 2,418,931

RECOVERY OF HALOGENS

Everett Gorin, Dallas, Tex., assignor, by mesne assignments, to Socony-Vacuum Oil Company, Incorporated, New York, N. Y., a corporation of New York Application November 9, 1945, Serial No. 627,765

14 Claims. (Cl. 23—219)

This invention relates to the manufacture of chlorine from hydrochloric acid and includes within its scope an improved process for the preparation of a chlorination agent such as cupric chloride. This application is a continuation-in-part of my copending application Serial Number 507,616, filed October 25, 1943.

As a reagent chlorine is very important in the petroleum and organic chemical industries. It is especially valuable as an oxidizing agent in the production of such essential materials as butadiene from butane or butylene, and vinyl chloride from ethane or ethylene. It is also very useful for the production of reactive intermediates from relatively inert hydrocarbon materials, such as methyl chloride and methylene chloride from methane and chlorbenzene from benzene.

In nearly all the applications of the type referred to above, chlorine is converted to hydrogen chloride simultaneously with the production of valuable compounds from the raw materials used. The lack of an available market for the hydrochloric acid produced tends to make processes of this kind uneconomical. The need for an efficient inexpensive method of reconverting the hydrochloric acid to chlorine is therefore apparent.

The prior art has employed, in general, two methods for converting hydrochloric acid to chlorine. The first method involves the direct catalytic oxidation of hydrogen chloride to chlorine. Common among the catalysts employed have been the copper salts, usually the halides, supported on porous materials, such as pumice. Oxides and salts of other metals, such as those of iron, manganese, chromium, nickel and platinum together with rare earth oxides also have been recognized as catalysts. Promoted copper catalysts having some other substance added to improve their catalytic activity have also been proposed. Among the addition agents suggested as effective are oxygen compounds of vanadium, beryllium, magnesium, bismuth, antimony, uranium and rare earth metal compounds. Double salts of copper and alkali chlorides have been claimed as superior catalysts to those containing only copper chloride. Also mentioned in the prior art are calcined alunite as well as alkali aluminium silicates, where the alkali metal has been exchanged by treatment with salt solutions containing heavy metal ions such as chromium, cobalt and the like.

These catalytic processes all suffer from the same disadvantage, viz., the products from the catalytic converters require difficult and expensive treatment in order that quantitative yields of pure chlorine be obtained. This is because the thermodynamics of the reaction require that the process be carried out at a temperature below 350° C., if quantitative conversion of hydrogen chloride to chlorine is to be achieved. At these temperatures even the most active of the known catalysts must be used in very large quantities if appreciable throughputs are to be obtained. It has therefore been necessary to sacrifice yields in favor of throughput and operate at higher temperatures. Consequently, the product must be processed for recovery of unconverted hydrochloric acid which must then be reconcentrated and returned to the converter. However, even though lower yields are accepted there is a definite limit to the increase of throughput attainable, for the maximum rate of conversion is obtained at temperatures in the neighborhood of from 450° C. to 470° C., a further increase in temperature leading to a decrease in the net rate.

The second method proposed in the prior art is a cyclic two-stage process, involving, in the first stage, absorption of the hydrogen chloride on a metal oxide, whereby the metal oxide is converted to the chloride, and, in the second stage, the reconversion of the metal chloride to the oxide and chlorine by means of oxygen at a higher temperature. Oxides which have been proposed as suitable are those of iron, magnesium and nickel. A typical example of this method is the "Mond" process.

The first step in this process, namely, the absorption of hydrogen chloride, is usually rather efficient, if carried out at low enough temperature; however, the second stage is usually inefficient, only a dilute chlorine containing gas being obtained. Also, the water formed in the first stage of the process is generally held tenaciously by the contact mass, resulting in the hydrolysis of the chloride to yield hydrogen chloride, when the temperature is raised to the level required for the second stage of the operation.

An additional disadvantage of cyclic processes of the above type, operating with a stationary contact mass, is the necessity for alternately cooling and heating the mass in the converter over a considerable temperature range, while changing over from one stage of the operation to the other. This results in heat losses and inefficient use of the converter during the heating and cooling operations. A primary object of the present invention is to provide a continuous circulating method for the production of cupric chloride chlorinating agent. A further object of the present invention is to provide an improved economical method for the production of chlorine from hydrochloric acid. Another object of the invention is the provision of a method whereby hydrochloric acid is efficiently utilized to produce chlorine on a quantitative basis. Another object of the invention is to provide a method whereby the chlorine produced is free from dilution with air or contamination with water or hydrochloric acid. Still another object of the invention is to afford a method for the production of chlorine from hydrochloric acid that is continuous in operation.

Other and further objects of my invention will be apparent from the description thereof and from the appended claims.

I have found that cupric chloride evolves chlorine to form cuprous chloride at a considerable rate at temperatures about 500° C. according to the following equation:

(1) $$2CuCl_2 \rightarrow Cu_2Cl_2 + Cl_2$$

The rate of evolution of the chlorine is a monotonic strongly increasing function of the temperature. Any desired rate of chlorine production may be obtained therefore by the choice of a suitably high temperature in excess of 500° C. Furthermore, I have found that the cuprous chloride may be reconverted to cupric chloride by reaction with hydrogen chloride and oxygen. This reaction may be made to proceed in two independent steps; i. e., the absorption of oxygen by blowing air, or oxygen, through cuprous chloride, and the subsequent formation of cupric chloride by the reaction of the oxychloride with hydrogen chloride. These reactions may be represented by the following equations:

(2) $$Cu_2Cl_2 + \tfrac{1}{2}O_2 \rightarrow CuO.CuCl_2$$

(3) $$CuO.CuCl_2 + 2HCl \rightarrow 2CuCl_2 + H_2O$$

I have found that quantitative absorption of hydrogen chloride, according to Equation 3, is readily attainable.

Essentially the present invention provides a continuous process for the production of a chlorinating agent, such as cupric chloride, and/or chlorine. Cuprous chloride is oxidized to cupric chloride by means of hydrogen chloride and oxygen or air and the cupric chloride thus formed may be used in cooperating continuous processes as a chlorinating agent or the cupric chloride may be thermally decomposed to produce chlorine. The cuprous chloride produced in such cooperating continuous process or for the production of chlorine per se may then be continuously recycled to the oxidation zone to be regenerated to cupric chloride. In order that the process be continuous, the invention preferably employs salt melts which are capable of being circulated through the various stages of the process. However, as indicated hereinbelow, the cuprous chloride, with or without an alkali metal chloride associated therewith, may be impregnated in porous finely divided carriers such as synthetic gels of the alumina or silica type or in finely divided acid-treated clay and the finely divided impregnated carrier can be continuously contacted with oxygen and HCl in hindered flow type operation and transferred in suspension to other stages of the process as described in the copending application of C. M. Fontana and E. Gorin, entitled Manufacture of halogenated hydrocarbons, Serial Number 548,351, filed August 7, 1944.

The invention may be best understood from the following description of the mode of operation thereof and the accompanying drawing.

Figure 1:
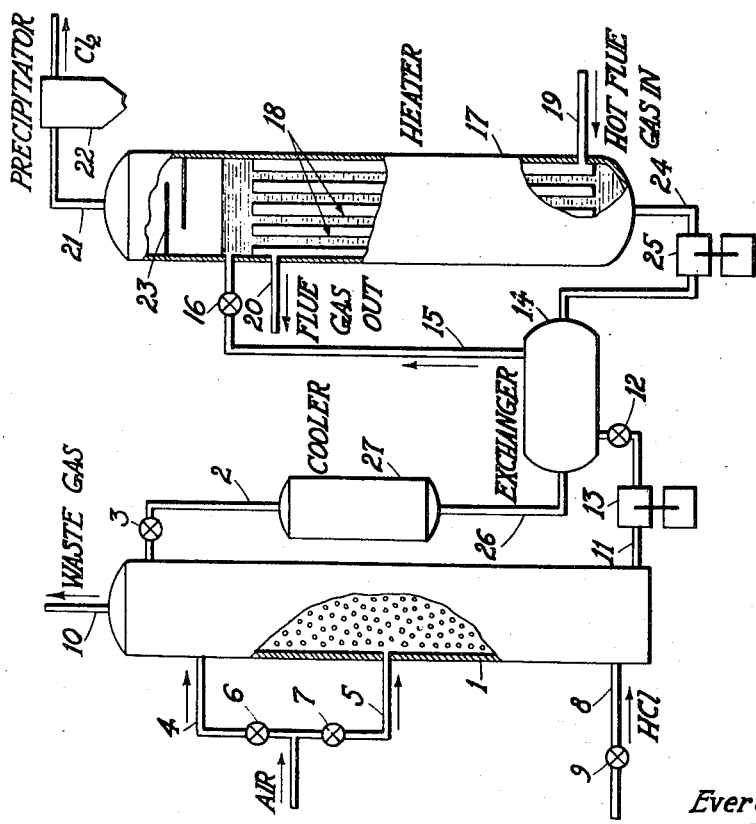

Referring to Figure 1 of the drawing, a melt containing a major proportion of cuprous chloride and a minor proportion of potassium chloride is admitted to the top of packed tower 1 through line 2, provided with a suitable control valve 3. The temperature of the melt entering the tower 1 should lie between 250° C. and 425° C. and preferably between 350° C. and 400° C. Air is preferably admitted to the tower at two points, viz., through inlet line 4, near the top of the tower but below the point of entry of the melt, and through inlet line 5, somewhat below the midpoint of the tower, each of these lines being provided with suitable control valves 6 and 7. Hydrochloric acid gas is admitted near the bottom of the tower through line 8, provided with control valve 9.

Thus, the melt, descending in the tower, is contacted first by air entering the tower through inlet 4 and then by a mixture of air and hydrogen chloride gas, which gases are admitted to the main reaction zone of the tower through lines 5 and 8. The gases are blown up through the tower countercurrent to the descending melt. Waste gases, almost completely free of hydrogen chloride, leave the top of the tower through line 10. If desired, this small amount of hydrogen chloride remaining in the exhaust gases may be recovered by condensing out a dilute solution of hydrochloric acid. The excess water may then be fractionated off and hydrochloric acid azeotrope residue vaporized and returned to the tower through line 9.

The admission of the reaction gases to the tower in the manner just above described is advantageous for the following reasons:

1. The probability of hydrogen chloride escaping unreacted from the top of the tower is effectively diminished because cupric oxychloride formed by the initial contacting of the melt with air from inlet line 4 will absorb practically all the hydrogen chloride which may pass through the main portion of the contact zone unchanged.

2. High throughout capacities are readily attained since the air-hydrogen chloride mixture which contacts the melt in the main reaction zone causes oxidation and chlorination of the melt to proceed simultaneously.

3. The melt on leaving the bottom of the tower is substantially free of water vapor, since in the last portion of its passage down through the tower it is subjected to the stripping action of dry hydrogen chloride. Thus, when the cupric chloride chlorinating agent is used in a coordinated chlorination process, such as the chlorination of organic compounds, it is highly essential that the cupric chloride be free of water vapor in order to avoid side reactions such as hydrolysis of the organic chlorides produced in the chlorination process. The stripping action of the HCl at temperatures of 200° C. or higher makes my continuous process for producing cupric chloride particularly advantageous.

In order that hydrogen chloride gas be efficiently utilized in the tower, it is recommended that the admission of the reaction gases be controlled so as to maintain a ratio of not exceeding 4 moles of hydrogen chloride per mole of oxygen entering the tower. The amount of hydrogen chloride fed to the tower should, however, be nearly equal to four times the amount of oxygen actually absorbed by the melt to prevent the building up of the oxychloride concentration in the circulating melt.

The exothermic heat of reaction causes the melt to heat up considerably. The temperature of the input gases should therefore be so regulated, after taking heat losses into account, that the temperature of the melt at the bottom of the tower does not exceed 475° C.; otherwise excessive amounts of chlorine will be evolved which will not be absorbed by the cooler melt in the upper portion of the tower and which will therefore escape from the top of the tower. Preferably, the temperature of the melt leaving the tower should not exceed 425° C.

The melt leaves tower 1 through line 11, provided with control valve 12, and is forced by pump 13 into heat exchanger 14 where it is preheated before passing through line 15, provided with valve 16, into heater 17 where it is decomposed to form cuprous chloride and free chlorine.

The heater consists of a series of vertical graphite tubes, 18, coated with silicon carbide, which conduct the flowing melt downward through the heating zone. The heat required to decompose the melt is supplied by means of hot flue gases, which are blown into the unit through line 19 and circulate around the melt-conducting tubes, finally passing out of the heater through vent 20. The amount of flue gas admitted is controlled so as to maintain the temperature of the melt in the conducting tubes between 500° C. and 600° C.

The level of the melt in the heater is maintained slightly above the inlet line 15, and the rate of flow of the melt through the heating zone is relatively slow to insure adequate time for the decomposition of cupric chloride and evolution of chlorine. An alternate procedure would be to allow the melt to run down the walls of the tubes in a thin film instead of operating the heater with the tubes liquid-full.

The pressure of the chlorine produced in the decomposition of the melt is sufficient to cause this gas, together with a small amount of vaporized halides, to flow out of the heater through line 21 to dust precipitator 22, wherein the condensed metallic halides are separated from the product stream. Baffles 23 are preferably provided in the vapor space of the heater to minimize entrainment of melt in the vapors leaving the heater. The chlorine product from the precipitator may then be cooled and compressed for storage.

The decomposed melt, consisting mainly of cuprous chloride, leaves the bottom of the heater through line 24 and is returned by pump 25 into heat exchanger 14 where it gives up a considerable portion of its heat to the melt flowing through the exchanger from tower 1 to heater 17. On leaving the heat exchanger, the melt is forced up through line 26 into cooler 27 where it is cooled to the desired temperature of from 350° to 400° C. before passing through line 2 back to the top of tower 1 for recycling through the process.

In the foregoing description of my invention, I have illustrated the thermal decomposition of the melt by means of a heater employing silicon carbide coated graphite tubes heated by flue gases. Obviously, various other means of supplying the heat necessary to decompose the melt can be satisfactorily used, and the invention is not to be construed as limited to the particular heater or heating method above proposed.

An alternative method for the operation of the contact tower, wherein the conversion of the cuprous chloride is carried out in two completely separate steps, the air and hydrogen chloride not being allowed to mix, is illustrated in Figure 2 of the drawing.

In this form of the invention, the packed tower 101 is divided into two sections, 102 and 103. The circulating melt enters section 102, i. e., the oxidizing section, through line 104 near the top of the tower. As the melt flows down through the tower, it is contacted by a countercurrent stream of air entering the tower through line 105. Waste gas leaves the top of the tower through vent 106. The partially oxidized melt is collected on plate 107, whence it flows downward through pipe 108 into section 103, i. e., the halogenating section. Tray 109 is disposed underneath the downflow pipe 108 so that the lower end of the pipe is below the edge of the tray. The melt issuing from the pipe first fills, and then overflows the tray. This arrangement acts as a liquid seal, separating the contact sections 102 and 103 and preventing gases from passing from one section to the other. Also, the melt in overflowing from the tray is dispersed uniformly over the packing in the lower section of the tower. Here the descending melt is contacted by a countercurrent stream of hydrogen chloride gas entering the bottom of the tower through line 110. As indicated in the description of the first form of the invention, the temperature of the melt in the contact tower should preferably lie between 350° C. and 425° C., and in any case should never be allowed to go below 250° C. at the entrance to the tower or exceed about 475° C. at the exit from the tower.

A limiting factor in carrying out the invention in this manner is the solubility of cupric oxychloride in the mixed melt. It is not practical at the operating temperatures of the process to allow the concentration of the oxychloride in the melt to exceed about 30 mole percent, if separation of this component from the melt mix is to be prevented. However, the cupric chloride content of the melt leaving the tower can be conveniently increased to a concentration within the range of 45 to 50 percent above that of the melt being fed to the tower by passing the melt through successive oxidation and halogenation stages before sending the melt to the dehalogenation stage. This may be done either by sending the partially halogenated melt to a second reaction tower or by recycling part of the halogenated melt in the manner well understood by those skilled in the art. The recycle method is described hereinafter for illustrative purposes.

The melt leaving the reaction tower through line 112, provided with a suitable pump 113, is divided into two streams in lines 114 and 115 so that part of the melt may be recycled through the tower to build up the cupric chloride concentration to the desired level. The melt in line 115 is passed through heat exchanger 14 and thence to the heater for dehalogenation, as previously described in connection with Figure 1. The recycle stream in line 114 is mixed with the dechlorinated melt, returning from the heater through heat exchanger 14 and line 116. The mixture then passes into cooler 117 wherein it is brought to the desired temperature level of from 350° C. to 400° C. before passing through line 104 to return to the contact tower for recycling through the process.

The melt, just before passing out of the tower 101, may be subjected to the purging action of a stream of inert gas, such as nitrogen. This treatment will substantially free the melt of water vapor and also help to sweep the waste vapors formed in the lower section out of the tower through vent 111.

By use of the method just described, quantitative yields of chlorine are readily attainable since hydrogen chloride always comes into contact with melt containing oxychloride.

It is evident that the amount of chlorine produced per unit of melt passed through the reaction tower is less than that obtained by the method proposed in the first form of my invention, since the change in cupric chloride content of the melt between the chlorination stage and the dehalogenation stage of the process will not exceed about 45 to 50 percent (assuming a 1:1 recycle ratio). However, if larger production rates are desired, they may be attained by the employment of a larger contact tower. The output capacity of this second form of my invention may be increased by suitably increasing the size of the tower used.

In describing my invention, I have stated the preferred temperature range in the contact tower to be from 350° C. to 425° C. Though some variations from this temperature range can be tolerated, temperatures below 200° C., or above 475° C., cannot be satisfactorily employed since in the one case, i. e., below 200° C., complete removal of water vapor from the copper halides is not assured and the reaction becomes too slow, while in the other case, i. e., above 475° C., an excessive amount of chlorine gas would be prematurely evolved, due to decomposition of the cupric chloride. Where the copper halides are circulated as melts, temperatures below 250° C. for the oxychlorination reaction are not practical since salt mixtures having melting points safely below this figure would not contain sufficient copper chlorides to make the process satisfactory. Also, I have illustrated the heating zone of heater 17 as being operated at a temperature of from 500° C. to 600° C. This temperature range is preferred because below 500° C. the decomposition of cupric chloride is incomplete and a quantitative yield of chlorine cannot be practically attained, while at temperatures much above 600° C. excessive quantities of the cuprous chloride are vaporized from the melt. About 800° C. represents the upper practical limit, although theoretically temperatures up to the boiling point of cuprous chloride could be used.

When using melts it is not practical to carry out the oxychlorination reaction to effect complete conversion of cuprous chloride to cupric chloride for the following reasons: (1) The solubility of the cupric chloride in the mixed salt melt is limited, and (2) the rate of the reaction decreases somewhat as the cupric chloride concentration increases. When operating with supports impregnated with the reactants the importance of reason (1) disappears.

The solubility of the cupric chloride depends on the composition of the melt employed. For example, in the case of a copper chloride-potassium chloride melt having a concentration of less than 30 percent of potassium chloride, the cupric chloride will precipitate out if the concentration exceeds 40 to 70 percent of the total copper present, the particular value depending on the temperature at which the melt issues from the bottom of the tower and the potassium chloride content. The solubility of cupric chloride on the basis of total copper may be increased to as high as 95 percent, however, by increasing the amount of potassium chloride in the melt. I have found that a double salt is formed between the copper and potassium chlorides which corresponds to the formula $K_2CuCl_4$. This salt is stable at the temperatures employed in the process. Consequently, the increased solubility of the cupric salt by addition of potassium chloride much above 30 mole percent does not make more cupric chloride available for dechlorination in the process. For this reason employment of melts having concentrations in excess of about 40 mole percent potassium chloride is not recommended.

In the preferred embodiment of my invention I employ copper halide melts. However, since copper halides have rather high melting points, it is usually desirable to add other halides to the melts in order to lower their melting points. It is necessary that the type of halide added be resistant to the action of oxygen and water vapor at temperatures below 475° C., and also that they be relatively non-volatile. In addition, it is desirable that relatively small additions of these other halides should cause relatively large depressions in the freezing point. Especially useful from this point of view are the alkali metal halides, particularly the chlorides. Certain halides of the heavy metals, such as those of lead, zinc, silver and thallium may be used in place of, or together with, the alkali metal halides.

The use of melts, which are capable of being circulated through the various process stages in the manner heretofore described, provides a practical and economical method of manufacturing chlorine from hydrochloric acid for the following reasons: (1) The operation of the process is continuous; the heat losses and unproductive periods inherent in processes employing stationary contact masses are wholly eliminated; and (2) the method is capable of producing a truly quantitative yield of substantially pure chlorine, requiring no additional physical separation process.

Although the use of salt melts is particularly advantageous from the viewpoint of continuous operation, I do not wish to restrict my invention to the use of melts only. Thus, solids, such as pumice, impregnated with copper halides may be circulated through the various stages of my process by any of the methods already disclosed in the prior art. The copper halides themselves need not necessarily be in the molten form in all of the stages of the process, particularly where temperatures in the lower portion of the range indicated for the oxychlorination steps are used, or where additional salts to lower the melting point of the copper halides are not used. An advantageous method of operating the process under such conditions is described in my copending application, Serial Number 507,617, filed October 25, 1943.

The amount of oxygen absorbed from the air by the melt is controlled by the rate of passage of air through the contact zone, the pressure of the gas, the length of the said zone and the efficiency of the packing therein. Moderate air pressures generally give rapid and efficient absorption of oxygen in the melt, although operation at atmospheric pressure gives satisfactory results. Air pressures between 1 and 40 atmospheres may be employed; however, the preferred range is between 1 and 15 atmospheres. Absorptions of from 35 to 75 percent of the oxygen from the contacting air are readily attainable. In general, it is not practical to attempt to remove all the oxygen from the air passing through the tower.

The reaction of the hydrogen chloride gas with the oxidized melt is rapid and quantitative. For efficient utilization of this gas, the amount thereof admitted to the tower, as hereinbefore stated, should be controlled so as to maintain as average ratio of 4 moles of hydrogen chloride per mole of oxygen absorbed in the tower.

The procedure illustrated in the description of my invention for providing efficient contact between the melt and the reacting gases consists in dispersing the melt over a contact mass in the gas stream. An equally effective method that may be used is to disperse the gases in the body of the melt. The dispersal may be effected by forcing the gas in the form of fine bubbles to ascend through the melt by any of the known means, such as by porous plates or thimbles. Several stages may be used by dispersing the gas in different portions of melt while the melt is passed continuously from one stage to another.

Throughout the preceding description of my invention I have referred to the compound formed by the oxidation of cuprous chloride with an oxygen containing gas, as cupric oxychloride, and have ascribed to it the formula $CuO \cdot CuCl_2$. Under the reaction conditions used this seems to be the compound formed. Whether or not this is the exact structure of the compound formed is immaterial to the process of the invention. Throughout the specification and claims by the term "cupric oxychloride," I refer to the partially oxidized cuprous chloride melt obtained by heating cuprous chloride in contact with air, and containing up to one mole of oxygen per two moles of cuprous chloride.

The following examples will serve to illustrate how hydrogen chloride may be quantitatively fixed by cuprous chloride to reform cupric chloride and also the ease with which chlorine may be obtained by the thermal decomposition of cupric chloride.

*Example 1*

Air was bubbled at the rate of 17 cc. per second through 65 cc. of a cuprous chloride salt melt contained in a Pyrex trap at 390° C. The initial composition of the melt was 85 mole percent of cuprous chloride and 15 mole percent of potassium chloride. An average of 9 percent of oxygen was removed from the air passing through the melt. After 1.1 grams of oxygen had been absorbed by the melt, a mixture comprising of 24 volume percent of hydrogen chloride and 76 volume percent of air was passed through the melt at a rate of 20 cc. per second for four minutes. A total of 91 percent of the hydrogen chloride was absorbed by the melt to form cupric chloride.

*Example 2*

The same sample of melt as in Example 1 was further oxygenated at a temperature of 375° C. until a total of 5 grams of oxygen had been absorbed. Hydrogen chloride was then passed through the melt at the rate of 4 cc. per second for 15 minutes. A total of 99 percent of the hydrogen chloride was absorbed by the melt. The melt after this experiment contained 46 mole percent of copper in the cupric form.

*Example 3*

A small porous thimble constructed of firebrick was immersed in 125 cc. of a copper chloride-potassium chloride melt, containing a ratio of 85 moles of copper to every 15 moles of potassium. 23.5 percent of the copper was in the cupric form. Air was passed through the thimble at a rate of 11 cc. per second while the temperature of the melt was maintained at 375° C. A total of 45 percent of the oxygen in the air was absorbed by the melt. After the melt had absorbed 8 grams of oxygen, 24 volume percent of hydrogen chloride was added to the air passing through the melt. A total of 99.5 percent of the hydrogen chloride was absorbed by the melt. The final melt contained 54 mole percent of copper in the cupric form.

*Example 4*

A melt having a composition by weight of 19.7 percent potassium chloride, 73.3 percent cupric chloride, and 7 percent cuprous chloride was entered into a heated packed tower at a rate of 200 grams per minute. The temperature maintained in the tower was within the range of from 475° C. to 580° C. The weight composition of the melt leaving the tower was 22 percent potassium chloride, 37.2 percent cupric chloride, and 40.8 percent cuprous chloride. Practically pure chlorine was evolved from the tower at a rate of 360 liters per hour.

The foregoing description of my invention has included only certain exemplary embodiments thereof, and my invention is not to be construed as limited except as indicated in the appended claims.

I claim:

1. A process for the production of chlorine from hydrogen chloride which comprises (1) continuously introducing a mass comprising at least one metallic chloride at least a major portion of which is cuprous chloride into a reaction zone at a temperature within the range of from 200° C. to 425° C., (2) countercurrently contacting the mass with hydrogen chloride and oxygen in the reaction zone while controlling the temperature within the range of from 200° C. to not above 475° C. to convert at least a part of the cuprous chloride to cupric chloride, (3) removing the water vapor formed from the reaction zone, (4) continuously withdrawing the mass containing the cupric chloride from the reaction zone and circulating the mass to a second separate reaction zone, (5) heating the mass in the second reaction zone to a temperature of from 500° C. to not above 800° C. to liberate chlorine and to reform cuprous chloride from the cupric chloride, (6) recovering the chlorine and (7) withdrawing the mass from the second reaction zone and recirculating it to the first reaction zone.

2. A process for the production of chlorine from hydrogen chloride which comprises (1) continuously introducing a salt mixture comprising a major portion of cuprous chloride into a reaction zone at a temperature within the range of from 200° C. to 425° C., (2) countercurrently contacting the mixture with a gaseous stream of hydrogen chloride and oxygen in the reaction zone while controlling the temperature within the range of from 200° C. to not above 475° C. to convert at least a part of the cuprous chloride to cupric chloride, (3) removing the water vapor formed from the reaction zone, (4) continuously withdrawing the salt mixture containing the cupric chloride from the reaction zone and circulating it to a second separate reaction zone, (5) heating the salt mixture in the second reaction zone to a temperature of from 500° C. to not above 800° C. to liberate chlorine and to reform cuprous chloride from the cupric chloride, (6) recovering the chlorine and (7) withdrawing the mixture from the second reaction zone and recirculating it to the first reaction zone.

3. A process for the production of chlorine from hydrogen chloride which comprises (1) continuously introducing a salt mixture comprising a major portion of cuprous chloride and a minor portion of cupric chloride and an alkali metal chloride into a reaction zone at a temperature within the range of from 200° C. to 425° C., (2) countercurrently contacting the mixture with hydrogen chloride and oxygen in the reaction zone while controlling the temperature within the range of from 200° C. to not above 475° C. to convert at least a part of the cuprous chloride to cupric chloride, (3) removing the water vapor formed from the reaction zone, (4) continuously withdrawing the salt mixture containing the cupric chloride from the reaction zone and circulating it to a second separate reaction zone, (5) heating the mass in the second reaction zone to a temperature of from 500° C. to not above 800° C. to liberate chlorine and to reform cuprous chloride from the cupric chloride, (6) recovering the chlorine and (7) withdrawing the mixture from the second reaction zone and recirculating it to the first reaction zone.

4. The process of claim 3 in which the alkali metal chloride is potassium chloride.

5. A process for the production of chlorine from hydrogen chloride which comprises (1) continuously introducing a mass comprising at least one metallic chloride at least a major portion of which is cuprous chloride into a reaction zone at a temperature within the range of from 200° C. to 425° C., (2) countercurrently contacting the mass with hydrogen chloride and oxygen in the reaction zone while controlling the temperature within the range of from 200° C. to not above 475° C. to convert at least a part of the cuprous chloride to cupric chloride, (3) removing the water vapor formed from the reaction zone, (4) continuously withdrawing the mass containing the cupric chloride from the reaction zone and circulating the mass to a second separate reaction zone, (5) heating the mass in the second reaction zone to a temperature of from 500° C. to not above 600° C. to liberate chlorine and to reform cuprous chloride from the cupric chloride, (6) recovering the chlorine and (7) withdrawing the mass from the second reaction zone and recirculating it to the first reaction zone.

6. A process for the production of chlorine from hydrogen chloride which comprises (1) continuously introducing a salt melt comprising a major portion of cuprous chloride into a reaction zone at a temperature within the range of from 250° C. to 425° C., (2) countercurrently contacting the melt with a gaseous stream of hydrogen chloride and oxygen in the reaction zone while controlling the temperature within the range of from 250° C. to 475° C. to convert at least a part of the cuprous chloride to cupric chloride, (3) removing the water vapor formed from the reaction zone, (4) continuously withdrawing the melt containing the cupric chloride from the reaction zone and circulating it to a second separate reaction zone, (5) heating the melt in the second reaction zone to a temperature of from 500° C. to not above 800° C. to liberate chlorine and to reform cuprous chloride from the cupric chloride, (6) recovering the chlorine and (7) withdrawing the melt from the second reaction zone and recirculating it to the first reaction zone.

7. A process for the production of chlorine from hydrogen chloride which comprises (1) continuously introducing a salt melt comprising a major portion of cuprous chloride and minor portions of cupric chloride and potassium chloride into a reaction zone at a temperature within the range of from 250° C. to 425° C., (2) countercurrently contacting the melt with a gaseous stream of hydrogen chloride and oxygen in the reaction zone while controlling the temperature within the range of from 250° C. to not above 475° C. to convert at least a part of the cuprous chloride to cupric chloride, (3) removing the water vapor formed from the reaction zone, (4) continuously withdrawing the melt containing the cupric chloride from the reaction zone and circulating it to a second separate reaction zone, (5) heating the melt in the second reaction zone to a temperature within the range of from 500° C. to 600° C. to liberate chlorine and to reform cuprous chloride from the cupric chloride, (6) recovering the chlorine and (7) withdrawing the melt from the second reaction zone and recirculating it to the first reaction zone.

8. A process for the production of chlorine from hydrogen chloride which comprises (1) continuously introducing a mass comprising at least one metallic chloride at least a major portion of which is cuprous chloride into a reaction zone at a temperature within the range of from 200° C. to 425° C., (2) countercurrently contacting the mass first with an oxygen containing gas and then with hydrogen chloride in the reaction zone while controlling the temperature within the range of from 200° C. to not above 475° C. to convert at least a part of the cuprous chloride to cupric chloride, (3) removing the water vapor formed from the reaction zone, (4) continuously withdrawing the mass containing the cupric chloride from the reaction zone and circulating the mass to a second separate reaction zone, (5) heating the mass in the second reaction zone to a temperature of from 500° C. to not above 800° C. to liberate chlorine and to reform cuprous chloride from the cupric chloride, (6) recovering the chlorine and (7) withdrawing the mass from the second reaction zone and recirculating it to the first reaction zone.

9. A process for the production of chlorine from hydrogen chloride which comprises (1) continuously introducing a mass comprising at least one metallic chloride at least a major portion of which is cuprous chloride into a reaction zone at a temperature within the range of from 200° C. to 425° C., (2) countercurrently contacting the mass with a gaseous mixture of hydrogen chloride and an oxygen containing gas in which the mol ratio of hydrogen chloride to oxygen is about 4 to 1 while controlling the temperature within the reaction zone within the range of from 200° C. to not above 475° C. to convert at least a part of the cuprous chloride to cupric chloride, (3) removing the water vapor formed from the reaction zone, (4) continuously withdrawing the mass containing the cupric chloride from the reaction zone and circulating the mass to a second reaction zone, (5) heating the mass in the second reaction zone to a temperature of from 500° C. to not above 800° C. to liberate chlorine and to reform cuprous chloride from the cupric chloride, (6) recovering the chlorine and (7) withdrawing the mass from the second reaction zone and recirculating it to the first reaction zone.

10. A process for the production of chlorine from hydrogen chloride which comprises (1) contacting a mass comprising at least one metallic chloride at least a major portion of which is cuprous chloride in a first reaction zone with an oxygen containing gas at a temperature within the range of from 200° C. to 425° C. to convert at least a part of the cuprous chloride to cupric oxychloride, (2) continuously introducing the mass withdrawn from the first reaction zone into a second reaction zone at a temperature within the range of from 200° C. to 425° C., (3) countercurrently contacting the mass with a gaseous stream of hydrogen chloride in the second reaction zone while controlling the temperature within the range of from 200° C. to not above 475° C. to convert at least a part of the cupric oxychloride to cupric chloride, (4) removing the water vapor formed from the second reaction zone, (5) continuously withdrawing the mass containing the cupric chloride from the second reaction zone and circulating it to a third reaction zone, (6) heating the mass in the third reaction zone to a temperature of from 500° C. to not above 800° C. to liberate chlorine and to reform cuprous chloride from the cupric chloride, (7) recovering the chlorine and (8) withdrawing the mass from the third reaction zone and recirculating it to the first reaction zone.

11. A process for the production of chlorine from hydrogen chloride which comprises (1) continuously introducing a mass comprising at least one metallic chloride at least a major portion of which is cuprous chloride into a reaction zone, (2) contacting the mass with hydrogen chloride and oxygen in the reaction zone while controlling the temperature within the range of from 200° C. to not above 425° C. to convert at least a part of the cuprous chloride to cupric chloride, (3) removing the water vapor formed from the reaction zone, (4) continuously withdrawing the mass containing the cupric chloride from the reaction zone and circulating the mass to a second separate reaction zone, (5) heating the mass in the second reaction zone to a temperature of from 500° C. to not above 800° C. to liberate chlorine and to reform cuprous chloride from the cupric chloride, (6) recovering the chlorine and (7) withdrawing the mass from the second reaction zone and recirculating it to the first reaction zone.

12. A process for the production of chlorine from hydrochloric acid which comprises contacting a circulating melt containing a major proportion of cuprous chloride and minor proportions of cupric chloride and an alkali metal chloride in a contact zone with an oxygen containing gas at a temperature of from 250° C. to 425° C., regulating the amount of said gas admitted to the contact zone so that the oxidized melt contains not more than 30 mole percent of cupric oxychloride, passing the partially oxidized melt into a second separate zone, countercurrently contacting the melt in said second zone with hydrochloric acid gas at a temperature of from 250° C. to 425° C., to form cupric chloride, removing water vapor from the second reaction zone, transferring the chlorinated melt to a separate heating zone, decomposing the melt therein at a temperature of from 500° C. to 800° C. to liberate chlorine and reform cuprous chloride, recovering the chlorine evolved, and recycling the melt to the first reaction zone.

13. A process for the production of chlorine from hydrochloric acid which comprises circulating a salt melt consisting of a major proportion of cuprous chloride and minor proportions of cupric chloride and potassium chloride downwardly through a reaction zone maintained at a temperature of from 350° C. to 425° C., contacting the descending melt with an oxygen containing gas to form cupric oxychloride and then with a mixture of hydrogen chloride gas and an oxygen containing gas to form cupric chloride, controlling the rate of admission of the said oxygen containing gas and the said hydrogen chloride gas so that a ratio of not more than four moles of hydrogen chloride to one mole of total oxygen is maintained with respect to the gases passing into the said reaction zone, removing water vapor from the said zone, circulating the melt to a separate heating zone, thermally decomposing the melt in the second zone at a temperature of from 500° C. to 600° C. to liberate chlorine and reform cuprous chloride, recovering the chlorine, and circulating the melt back to the said first reaction zone.

14. A process for the production of chlorine from hydrochloric acid which comprises contacting a continuously circulating melt comprising a major proportion of cuprous chloride with an oxygen containing gas in a reaction zone at a temperature of from 350° C. to 425° C. to form cupric oxychloride, regulating the amount of said gas admitted to said zone so that the amount of cupric oxychloride formed in said melt does not exceed 30 mole percent, continuously circulating the partially oxidized melt through a separate zone maintained at a temperature of from 350° C. to 425° C. in contact with hydrochloric acid gas to form cupric chloride, removing the water vapor from the said separate zone, recirculating part of the said melt to the mentioned first zone for further contacting the oxygen containing gas and hydrochloric acid gas, continuously circulating the remaining part of the melt to and through a separate heating zone, subjecting the melt therein to a temperature within the range of from 500° C. to 800° C. to reform cuprous chloride and to liberate chlorine, recovering the chlorine and continuously recirculating the melt to the first reaction zone for recirculation through the process.

EVERETT GORIN.

REFERENCES CITED

The following references are of record in the file of this patent:

UNITED STATES PATENTS

| Number | Name | Date |
|---|---|---|
| 1,677,831 | Krause | July 17, 1928 |
| 1,913,391 | Hutchinson | June 13, 1933 |
| 1,988,541 | Christensen | Jan. 22, 1935 |

FOREIGN PATENTS

| Number | Country | Date |
|---|---|---|
| 214,293 | British | Apr. 14, 1924 |
| 5 | British | 1864 |

OTHER REFERENCES

Mellor, Comprehensive Treatise on Inorganic and Theoretical Chemistry, vol. III, Longmans 1923, New York, pages 158, 159, 169.